Sept. 15, 1942.  S. SAFRANSKI ET AL  2,295,692
VACUUM PACKING MEANS OR THE LIKE
Filed Aug. 19, 1939  5 Sheets-Sheet 1

Inventors:
Stanley Safranski and
Richard Millenaar.

By A. Trevor Jones
Atty.

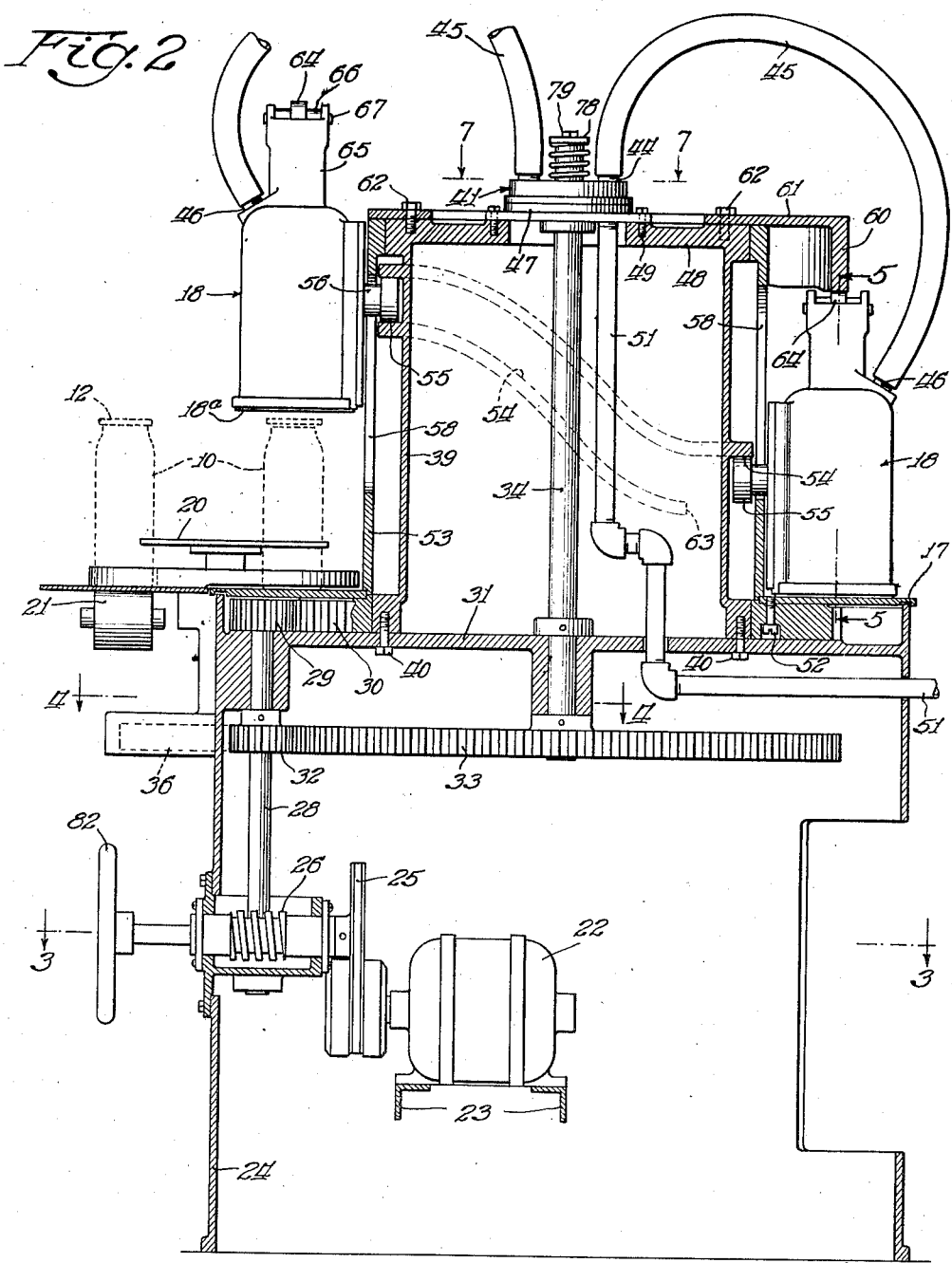

Sept. 15, 1942.  S. SAFRANSKI ET AL  2,295,692
VACUUM PACKING MEANS OR THE LIKE
Filed Aug. 19, 1939  5 Sheets-Sheet 3
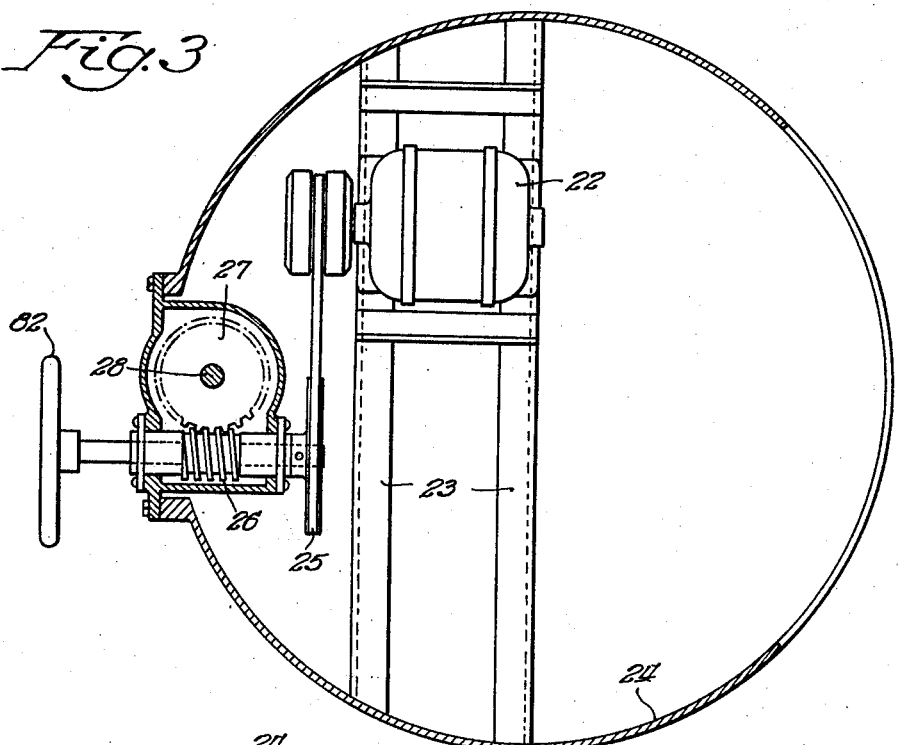
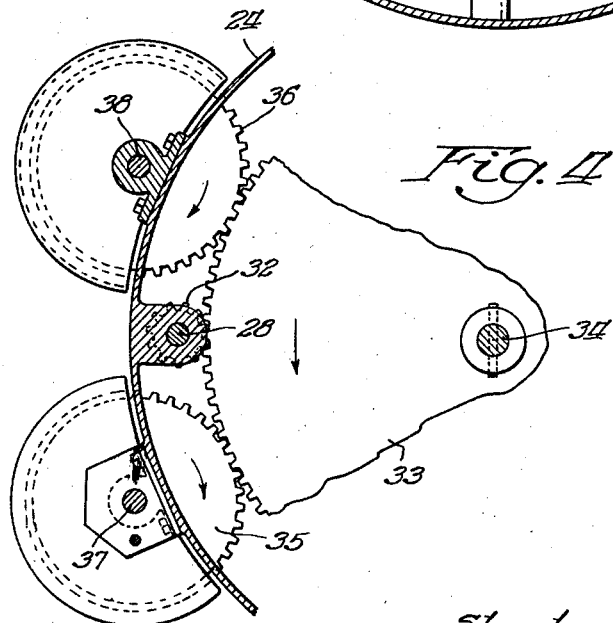
Inventors
Stanley Safranski and
Richard Millenaar.
By: A. Trevor Jones
Atty.

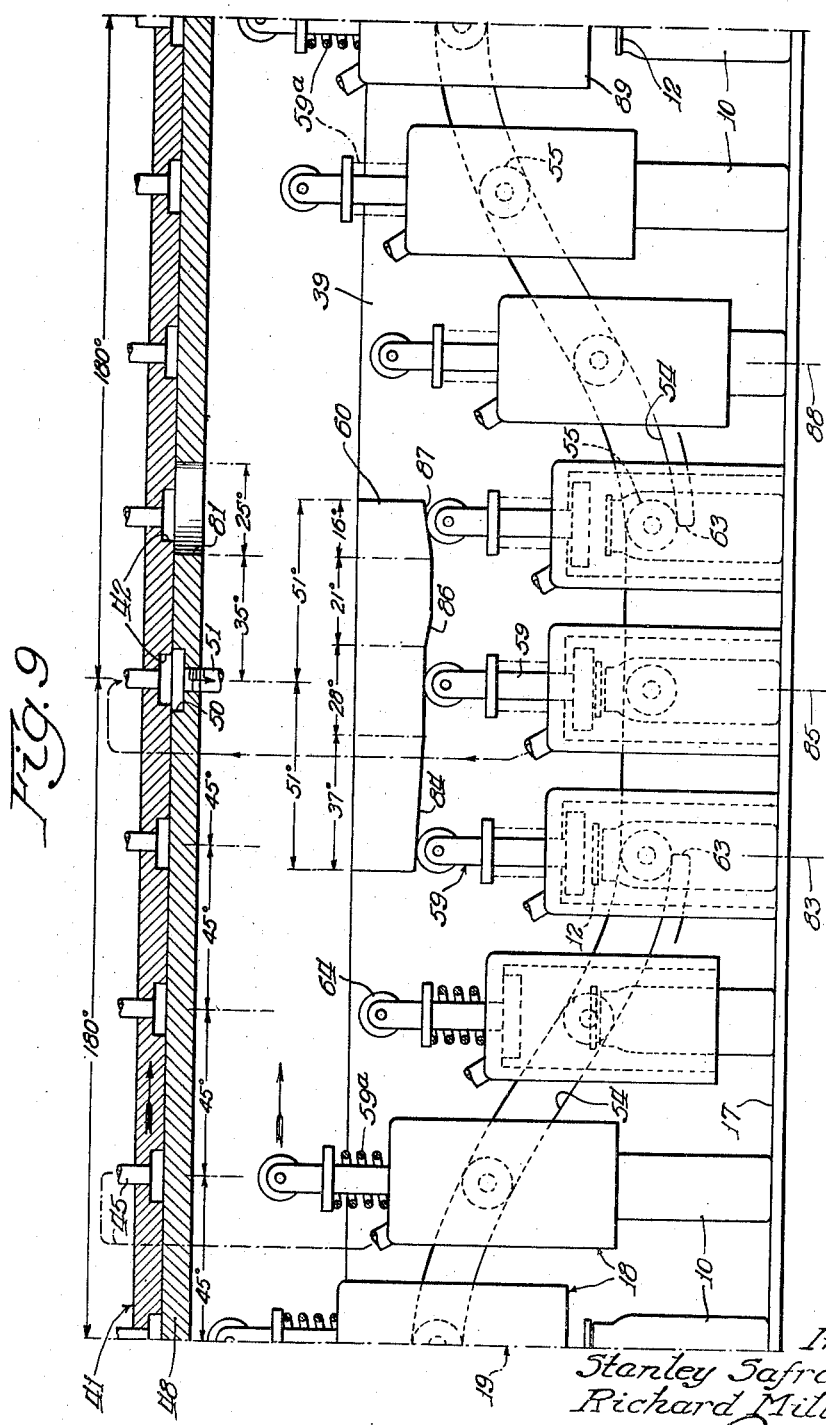

Patented Sept. 15, 1942

2,295,692

UNITED STATES PATENT OFFICE 2,295,692

VACUUM PACKING MEANS OR THE LIKE

Stanley Safranski, Chicago, and Richard Millenaar, Oak Park, Ill., assignors to The Aridor Company, Chicago, Ill., a corporation of Illinois Application August 19, 1939, Serial No. 290,943

9 Claims. (Cl. 226—82)

This invention relates to vacuum packing means or the like, and aims to provide improved and simplified means for this purpose.

The invention will be understood by reference to the accompanying drawings, in which—

Figure 2 is a vertical section taken on the line 2—2 of Fig. 1;

Figure 3 is a plan section taken on the line 3—3 of Fig. 2;

Figure 4 is another plan section taken on the line 4—4 of Fig. 2;

Figure 9 is a schematic projection of the cycle phases.

Figure 5:
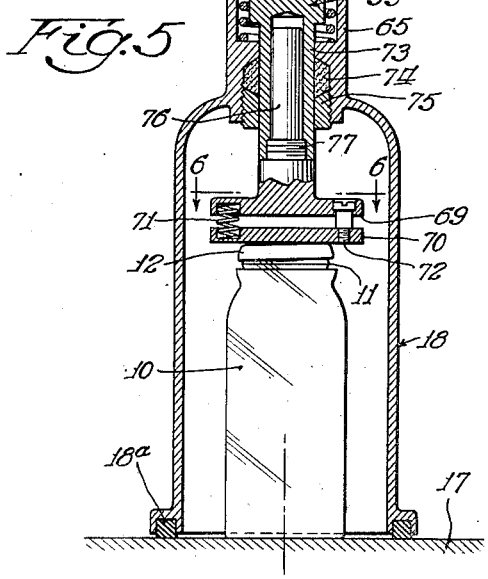
Figure 5 is a partial enlarged vertical section taken on the line 5—5 of Fig. 2.
Figure 6:
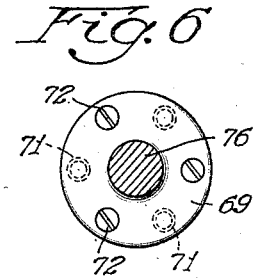
Figure 6 is a plan section taken on the line 6—6 of Fig. 5.
Figure 7:
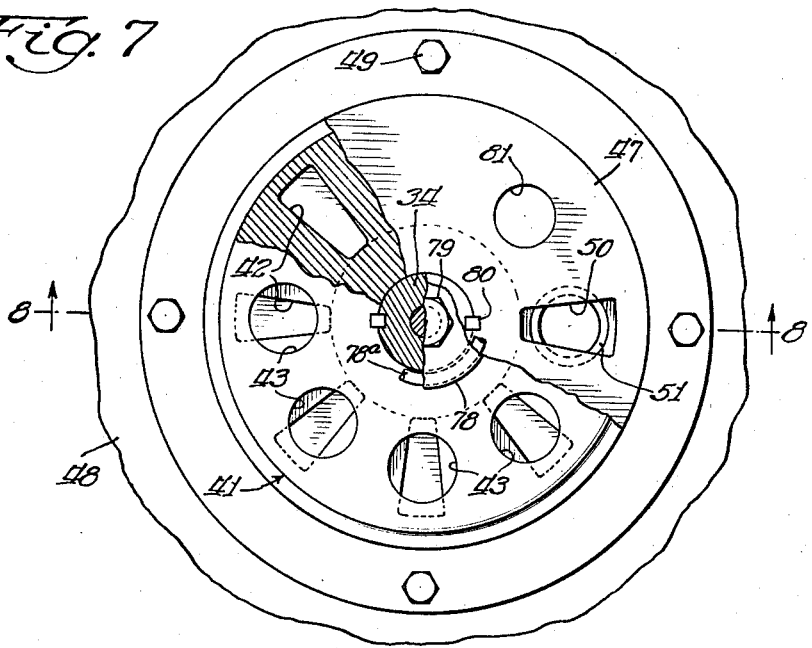
Figure 7 is an enlarged partial plan section taken on the line 7—7 of Fig. 2.
Figure 8:
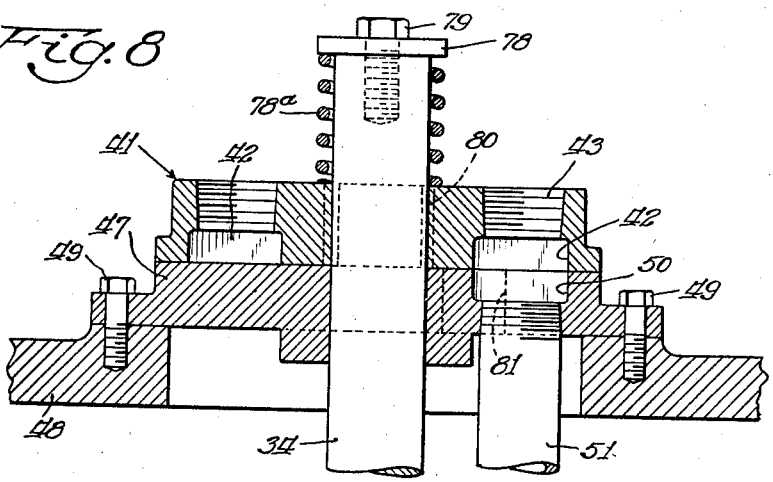
Figure 8 is a partial vertical section taken on the line 8—8 of Fig. 7.

A bottle or other similar container 10 provided with a sealing lip 11, Fig. 5, and a cap 12 adapted to be pressed over said lip to provide a sealed closure for said container, may be transported as by a conventional belt conveyor 13 along with a continuous succession of such containers and caps into a field of action of a rotated injector disk 14. The rotating disk 14 has a plurality, in this instance, three, finger-like portions 15, one of which propels a container with its cap loosely carried thereon about a track 16 and onto a turntable 17. Rotation of the injector disk 14 is so timed as to locate a container 10 directly beneath one of the packing hoods 18 carried by the turntable 17 as presently described. The finger-like portions 15 of the injector disk 14 are spaced apart a distance which will place a container successively under a hood. The turntable 17 carries in this instance eight of these packing hoods in uniformly spaced circumferential arrangement and the turntable 17 may carry simultaneously a container which is being sealed associated with seven of the packing hoods in various phases of the packing operation, while one of the hoods which happens to be at a particular moment at the point 19, Fig. 1, will have just unloaded its completely packed container to the ejector disk 20 which rotates the container onto another belt conveyor 21, and the packing hood will be ready to receive another container from the injector disk 14.

Power transmission means for the parts will next be described. The turntable 17 is here shown driven by a variable speed motor 22 carried on cross-beam 23 mounted on and within the hollow cylindrical base 24 for the apparatus. A belt 25 from the motor drives a worm shaft 26 which meshes with a worm gear 27 fixed on a vertical common shaft 28 all carried by the table base. The shaft 28 terminates at its upper end in a pinion 29 which meshes with a large gear ring 30 rotatable on the upper face 31 of the base 24. The gear ring 30 carries the turntable 17 which is fixed thereto to overhang the pinion 29.

Intermedially of the shaft 28 is another pinion 32 which meshes with and drives a large gear 33 suspended on the lower end of a shaft 34 within the base 24 and co-axial with the turntable 17. The gear 33 also meshes with gears 35 and 36 respectively (Fig. 4) which drive respectively the injector and ejector disks 14 and 20 through shafts 37 and 38 respectively, these parts being suitably mounted as best shown in Fig. 4 also on the base 24.

The gear 33 also rotates the shaft 34 upon which it is suspended. The shaft 34 passes upwardly through the hollow stationary turret 39 fixed on the base top 31 as by stud-bolts 40 and at its upper end has keyed thereto a revolving valve header 41. The header 41 has eight uniformly circumferentially spaced apart trapezoidal passages 42 therethrough into each of which as by a threaded circular mouth-part 43 is screwed a nipple 44 for one of the hose connections 45. There is one of these hose connections 45 for each of the packing hoods 18 and the other end of the hose is connected by the nipple 46 with the interior of the hood.

A stationary valve block 47 is carried by the upper wall 48 of the stationary turret 39 as by stud-bolts 49 and has a valve port 50 therein corresponding in size and shape to the trapezoidal passages 42. To the port 50 is connected an exhaust pipe 51 suitably connected with a conventional exhaust pump not necessary to be here shown or described. The trapezoidal formations of the passages 42 and valve port 50 arranged in truncated sector position provide that these parts meet along a radius so that the air within the hood has a radially elongated escape aperture when the passages 42 are in communication with the port 50. To lengthen the suction period, the port 50 is desirably slightly wider circumferentially than the passages 42.

The gear ring 30 which has been described as carrying the turntable 17 may be keyed thereto as by a set-screw 52 and rising from the turntable 17 is a revolving turret part 53 which turns with and is an operative part of the turntable. The packing hoods 18 are carried by this revolving turret part 53 and are vertically reciprocal thereon by a cam groove 54 on the face of the stationary turret 39 in which travel cam rollers 55 mounted on hood extensions such as stub-shafts 56 secured to faces 57 of the hoods. Stub-shafts 56 pass through vertical slots 58 in the revolving turret part 53. This face 57 of the hood may advantageously have a sliding tongue-and-groove connection as at 57a on the revolving turret 53 to guide the hood in its vertical movement in the slot 58 under the influence of the cam groove 54 and by interengagement prevent rotation of the hoods with respect to the turntable.

The cam groove 54 is so arranged that as a container is moved beneath a hood by the injector disk 14 the hood is elevated to its upper limit as shown at the left-hand side of Fig. 2 and, as the parts move in a counterclockwise direction, the hood is progressively moved downwardly over the container, to the lower limit of movement of the hood, as shown at the right-hand side of Fig. 2.

Before the hood reaches the position shown at the right-hand side of Fig. 2, a plunger mechanism 59 carried within the hood engages a segmental overhead track 60. The track 60 is carried by a cap-plate 61 secured as by stud-bolts 62 upon the top wall 48 of the stationary turret 39.

The lower wall of the cam groove 54 is discontinued as at 63 in the vicinity of the right-hand side of the apparatus so that in this region the hoods are pressed downwardly not only by the cam groove 54 and rollers 55 but also by the overhead track 60, for a purpose presently described, through the plunger mechanism 59.

The plunger mechanism 59 includes a cam roller 64 which is projected through the upper reduced end 65 of the hood. The roller 64 is journaled in a vertically slidable bifurcated bearing 66, the ends of the pintle 67 for the cam roller 64 projecting through slots 68 in the hood top to permit and limit vertical movement of the plunger mechanism in the hook. At its lower end the plunger mechanism terminates in a disk 69, and the disk 69 has fastened to it another disk 70. The disks 69 and 70 are resiliently pressed apart by compression coil springs 71 within the limits of movement of screws 72 fixed in the lower disk 70 and passing into the upper disk 69. The plunger leg 73 passes through a gland 74 which is retained by a nut 75. The plunger leg 73 carries the disks 69 and 70 through the intermediation of an interiorly telescoping leg 76 which is screw-threadedly received as at 77 in the outer leg 73, and by relative rotation of the legs 73 and 76 pressure of the plunger mechanism upon the bottle cap as next described to suit varying heights of containers may be adjusted. For greatly varying heights of containers, one of the legs 76 with its connected disks may be entirely removed and another like it inserted having a different length between the screw-threads 77 and the disks 69, 70. The plunger mechanism 59 is normally retracted upwardly within the limits of the slot 68 by a coil spring 59a. A gasket 18a about the periphery of the open lower mouth of the hood 18 is intended to contact the turntable 17 when the hood is in lowermost position.

A rather heavy compression coil spring 78a between the header 41 and a washer 78 secured by a nut 79 at the top of the shaft 34 maintains the header in close sliding abutment with the valve block 47 on the feathered connection 80 which keys the header to the shaft.

In addition to the exhaust port 50 in the valve block 47 there is another port 81 circumferentially spaced from the valve port 50 and open to the atmosphere within the hollow interior of the stationary turret 39.

A hand wheel 82 connected with the worm shaft 26 permits manual actuation of the parts independently of the motor 22 when desired as for adjustment of the relative phases.

Figure 1:
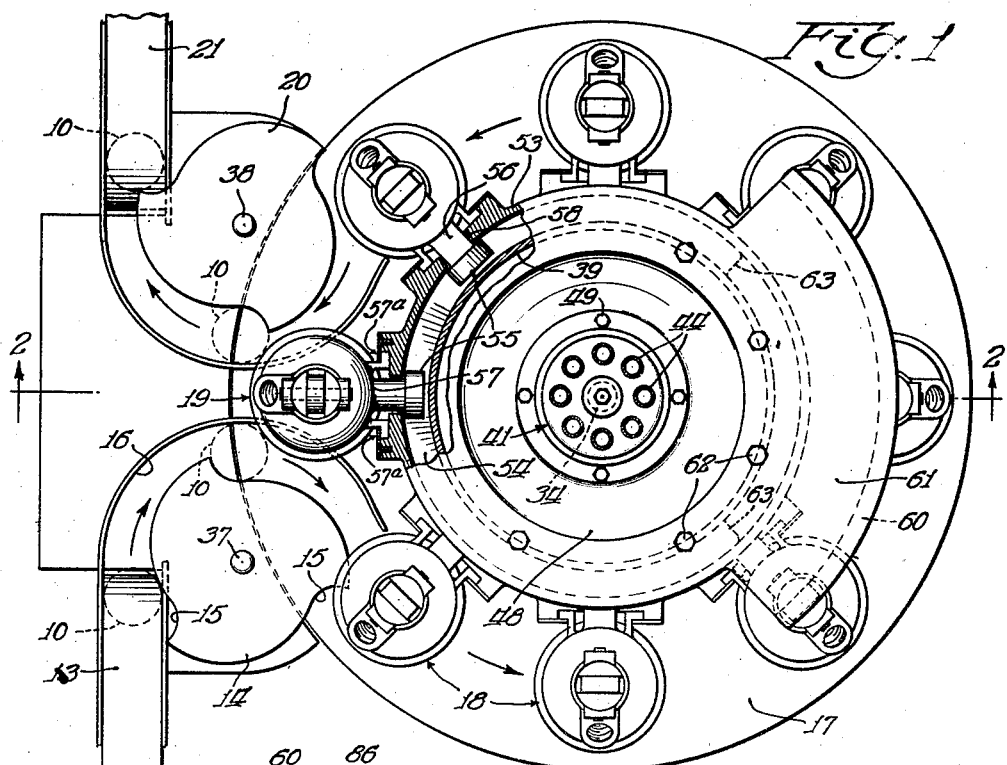
Figure 1 is a plan view of the improved means, parts being shown in section.

The operation of the mechanism is as next described:

Referring to Fig. 9, the point 19 in Fig. 1 indicates the phase of operation shown at the left-hand end of a plane projection of the circle described by the eight packing hoods. As will be best understood from Fig. 9, when a container 10 with its cap 12 loosely placed on top thereof is disposed on the turntable 17 in vertical alignment with one of the hoods 18 and begins to move counterclockwise on the table, the hood is progressively lowered by the cam groove roller arrangement 54, 55, until at the point 83 the hood makes a substantially air-tight seal with the turntable 17. Thereupon the plunger mechanism 59 is depressed against the action of the spring 59a by the overhead track 60. The track 60 is also a cam and at its proximal end declines gradually as at 84 until the plunger mechanism is lowered sufficiently to contact the container cap 12 and hold the cap lightly in place on the container while the passage 42 of the hood unit passes over the exhaust port 50. At this point 85 the air is exhausted from the hood and container within the hood while the container cap is lightly held by the plunger mechanism as just described. Just before the passage 42 has passed out of communication with the exhaust port 50 the overhead track 60 has a further depressing cam action as at 86 on the plunger mechanism 59 which presses the container cap 12 tightly onto the container 10, and thus the vacuum packing operation is completed. The overhead track then has a cam rise 87 which permits the plunger mechanism 59 to be retracted under the influence of the spring 59a away from the container cap and at the same time the passage 42 comes into communication with the atmospheric port 81 which permits air to pass in the opposite direction back into the hood to permit the hood to be readily raised by the cam groove and roller arrangement 54, 55 as at 88, and to be continued to be raised until the hood is free of the container as at 89 and the container is then removed from the turntable by the action of the ejector disk 20.

The invention is not limited to details of construction shown for purposes of illustration, and various combinations and sub-combinations may be advantageously employed.

What is claimed is:

1. In a vacuum packing machine, the combination with a base having a stationary turret thereon and a valve block on the upper surface of said turret, of a turntable having a turret part telescoping said stationary turret, a central shaft, a revolving header mating with said valve block and keyed to the central shaft, a large gear within the base keyed in driving relation to said shaft, a gear ring fixed to said turntable, a common shaft having spaced apart pinions engaging said gear and said gear ring, and a motor within the base in driving relation with said common shaft.

2. In a vacuum packing machine, the combination with a base, of a turntable, a pair of relatively revolvable turrets disposed telescopically centrally of the turntable, the outer turret revolving with the table and the inner turret having a cam groove, a valve block on the upper surface of the inner turret, a central shaft, a revolving header mating with said valve block and keyed to the central shaft, a series of circumferentially disposed hoods carried by the outer turret and movable vertically toward and from the table, an exhaust pipe from each hood to said header, extensions on said hoods, rollers on said extensions, the inner turret cam groove receiving the rollers for progressively depressing and elevating the hoods during the operative cycle of the table, slots in the outer turret passing the hood extensions therethrough, the hood extensions being movable vertically in said slots, a plunger carried by each hood, a segmental overhead track carried by the inner turret in the region of the lower run of the cam groove for engaging and depressing the plungers, a large gear within the base keyed in driving relation to said shaft, a gear ring fixed to said turntable, a common shaft having spaced apart pinions engaging said gear and said gear ring, and a motor in driving relation with said common shaft.

3. In vacuum packing means or the like, the combination with a turntable, of a pair of relatively revolvable turrets disposed telescopically centrally of the turntable, one of said turrets revolving with the table, a series of circumferentially disposed hoods carried by the revolvable turret and movable vertically with respect to the table, extensions on said hoods, rollers on said extensions, the stationary turret having a cam groove receiving the rollers for progressively depressing and elevating the hoods during the operative cycle of the table, slots in the revolvable turret passing the hood extensions therethrough, the hood extensions being movable vertically in said slots, a plunger carried by each hood, means including a segmental elevated track carried by the stationary turret in the region of the lower run of the cam groove for depressing the plungers, and interengaging means preventing rotation of the hoods with respect to the turntable while permitting said vertical movement.

4. In a vacuum packing machine, the combination with a base having a stationary turret thereon and a valve block on the upper surface of said turret, of a turntable having a turret part telescoping said stationary turret, a central shaft, a revolving header mating with said valve block and keyed to the central shaft, a series of circumferentially spaced hoods carried by the turntable turret part, an exhaust pipe from each hood to said header, means for reciprocating the hoods vertically toward and from the table, a large gear within the base keyed in driving relation to said shaft, a gear ring fixed to said turntable, a common shaft having spaced apart pinions engaging said gear and said gear ring, and a motor within the base in driving relation to said common shaft.

5. In a vacuum packing machine, the combination with a base having a stationary turret thereon and a valve block on the upper surface of said turret, of a turntable having a turret part telescoping said stationary turret, a central shaft, a revolving header mating with said valve block and keyed to the central shaft, a series of circumferentially spaced hoods carried by the turntable turret part, an exhaust pipe from each hood to said header, interengaging slidable cam parts on the turrets and hoods for reciprocating the hoods vertically toward and from the table, and common means for revolving the turntable and header.

6. In vacuum packing means, the combination with a base having a stationary turret thereon and a valve block on the upper surface of said turret, of a turntable having a turret part telescoping said stationary turret, a central shaft passing vertically through the turrets and through the valve block, a revolving header mating with said valve block and keyed to the central shaft, a series of circumferentially spaced hoods carried by the turntable turret part, an exhaust pipe from each hood to said header, and means for revolving the turntable and header.

7. In a vacuum packing machine, the combination with a base having a stationary turret thereon and a valve block on the upper surface of said turret, of a turntable, a central shaft, a revolving header mating with said valve block and keyed to the central shaft, a spring on the shaft pressing the header against the valve block, a large gear within the base keyed in driving relation to said central shaft, a gear ring fixed to said turntable, a common shaft having spaced apart pinions engaging said large gear and said gear ring, an injector device and an ejector device associated with the turntable, means for driving said devices from said large gear, and means for driving said common shaft.

8. In a vacuum packing machine, the combination with a base having a stationary turret thereon and a valve block on the upper surface of said turret, of a turntable, a central shaft, a revolving header mating with sad valve block and keyed to the central shaft, a large gear keyed in driving relation to said central shaft, a gear ring fixed to said turntable, transmission means engaging said large gear and said gear ring, and a motor within the base in driving relation with said transmission means, wherein the motor is connected with the transmission means through a worm shaft and wherein the worm shaft has a hand wheel thereon for manual operation of the machine.

9. In a vacuum packing machine, the combination with a base having a stationary turret thereon and a valve block on the upper surface of said turret, of a turntable having a turret part telescoping said stationary turret, a revolving header mating with said valve block and keyed to said turntable, power transmission means in driving relation to said turntable, wherein the revolving turret carries a plurality of circumferentially spaced vertically reciprocal hoods through the intermediation of extensions on the hoods and wherein the stationary turret has a cam groove thereon receiving cam rollers on the hood extensions and the hood extensions move in vertical slots in the revolving turret through the actuation of said cam groove and rollers.

STANLEY SAFRANSKI.
RICHARD MILLENAAR.